(12) United States Patent
Brasfield et al.

(10) Patent No.: US 12,542,191 B1
(45) Date of Patent: Feb. 3, 2026

(54) READ LEVEL CALIBRATION WITH INFORMATION COLLECTION SKIPPING

(71) Applicant: Micron Technology, Inc., Boise, ID (US)

(72) Inventors: Sean Brasfield, Boise, ID (US); Chong Giap Chiew, San Jose, CA (US); Tawalin Opastrakoon, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 2 days.

(21) Appl. No.: 18/790,921

(22) Filed: Jul. 31, 2024

(51) Int. Cl.
*G11C 29/00* (2006.01)
*G11C 16/04* (2006.01)
*G11C 16/26* (2006.01)
*G11C 29/50* (2006.01)

(52) U.S. Cl.
CPC .... *G11C 29/50004* (2013.01); *G11C 16/0483* (2013.01); *G11C 16/26* (2013.01); *G11C 2029/5004* (2013.01)

(58) Field of Classification Search
None
See application file for complete search history.

(56) References Cited

U.S. PATENT DOCUMENTS

| | | | |
|---|---|---|---|
| 8,379,457 B1 * | 2/2013 | Chen | G06F 13/1689 |
| | | | 365/185.23 |
| 10,552,063 B2 * | 2/2020 | Papandreou | G06F 3/0665 |
| 10,699,791 B2 * | 6/2020 | Pletka | G06F 3/0604 |
| 2013/0194873 A1 * | 8/2013 | Chen | G06F 13/1689 |
| | | | 365/185.18 |
| 2019/0391746 A1 * | 12/2019 | Papandreou | G06F 3/0679 |
| 2020/0066353 A1 * | 2/2020 | Pletka | G06F 3/0604 |
| 2022/0044737 A1 * | 2/2022 | Khayat | G11C 11/5642 |

* cited by examiner

*Primary Examiner* — Mujtaba M Chaudry
(74) *Attorney, Agent, or Firm* — Schwegman Lundberg & Woessner, P.A.

(57) ABSTRACT

Various embodiments provide for performing a read voltage level calibration process with selective skipping collection of calibration-related information on a memory device of a memory system, such as a memory sub-system. For example, some embodiments provide for performing a coarse threshold estimate (CTE) calibration process, with selective skipping of failed bit count (CFBit) information collection, on a memory system.

20 Claims, 7 Drawing Sheets

READ LEVEL CALIBRATION WITH INFORMATION COLLECTION SKIPPING

TECHNICAL FIELD

Embodiments of the disclosure relate generally to memory devices and, more specifically, to performing a read voltage level calibration process with selective skipping of information collection on a memory device (e.g., NOT-AND (NAND)-type memory device) of a memory system, such as a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Aspects of the present disclosure are directed to performing a read voltage level calibration process with selective skipping of information collection on a memory device (e.g., NOT-AND (NAND)-type memory device) of a memory system, such as a memory sub-system. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can send access requests to the memory sub-system, such as to store data at the memory sub-system and to read data from the memory sub-system.

The host system can send access requests (e.g., write command, read command) to the memory sub-system, such as to store data on a memory device at the memory sub-system, read data from the memory device on the memory sub-system, or write/read constructs (e.g., such as submission and completion queues) with respect to a memory device on the memory sub-system. The data to be read or written, as specified by a host request, is hereinafter referred to as "host data" or "user data."

A host request can include logical address information (e.g., logical block address (LBA), namespace) for the host data, which is the location the host system associates with the host data and a particular zone in which to store or access the host data. The logical address information (e.g., LBA, namespace) can be part of metadata for the host data. Metadata can also include error handling data (e.g., error-correcting code (ECC) code word, parity code), data version (e.g., used to distinguish age of data written), valid bitmap (which LBAs or logical transfer units contain valid data), and so forth.

The memory sub-system can initiate media management operations, such as a write operation, on host data that is stored on a memory device. For example, firmware of the memory sub-system may re-write previously written host data from a location of a memory device to a new location as part of garbage collection management operations. The data that is re-written, for example as initiated by the firmware, is hereinafter referred to as "garbage collection data."

"User data" hereinafter generally refers to host data and garbage collection data. "System data" hereinafter refers to data that is created and/or maintained by the memory sub-system for performing operations in response to host requests and for media management. Examples of system data include, and are not limited to, system tables (e.g., logical-to-physical memory address mapping table (also referred to herein as a L2P table), data from logging, scratch pad data, and so forth).

A memory device can be a non-volatile memory device. A non-volatile memory device is a package of one or more die. Each die can be comprised of one or more planes. For some types of non-volatile memory devices (e.g., AND-type devices), each plane is comprised of a set of physical blocks. For some memory devices, blocks are the smallest area that can be erased. Each block is comprised of a set of pages. Each page is comprised of a set of memory cells, which store bits of data. The memory devices can be raw memory devices (e.g., NAND), which are managed externally, for example, by an external controller. The memory devices can be managed memory devices (e.g., managed NAND), which are a raw memory device combined with a local embedded controller for memory management within the same memory device package. The memory device can be divided into one or more zones where each zone is associated with a different set of host data or user data or application.

Certain memory devices, such as NAND-type memory devices, comprise one or more blocks, (e.g., multiple blocks), with each of those blocks comprising multiple memory cells. For instance, a memory device can comprise multiple pages (also referred to as wordlines), with each page comprising a subset of memory cells of the memory device. A threshold voltage (VT) of a memory cell (of a block) can be the voltage at which the floating gate (e.g., NAND transistor), implementing the memory cell, turns on and conducts (e.g., to a bit line coupled to the memory cell). Generally, writing data to such memory devices involves programming (by way of a program operation) the memory devices at the page level of a block, and erasing data from such memory devices involves erasing the memory devices at the block level (e.g., page level erasure of data is not possible).

Generally, writing data to such memory devices involves programming (by way of a program operation) the memory devices at the page level of a block, and erasing data from such memory devices involves erasing the memory devices at the block level (e.g., page level erasure of data is not possible). Certain memory devices, such as NAND-type memory devices, comprise one or more blocks, (e.g., multiple blocks) with each of those blocks comprising multiple pages, where each page comprises a subset of memory cells of the block, and where a single wordline of a block (which connects a group of memory cells of the block together) defines one or more pages of a block (depending on the type of memory cell). Depending on the embodiment, different blocks can comprise different types of memory cells. For instance, a block (a single-level cell (SLC) block) can comprise multiple SLCs, a block (a multi-level cell (MLC) block) can comprise multiple MLCs, a block (a triple-level cell (TLC) block) can comprise multiple TLCs, a block (a quad-level cell (QLC) block) can comprise QLCs, and a block (a penta-level cell (PLC) block) can comprise PLCs. Other blocks comprising other types of memory cells (e.g., higher-level memory cells, having higher bit storage-per-cell) are also possible.

Each memory cell usually comprises a floating-gate transistor, where the level of an electrical charge "trapped" in the floating gate of the floating-gate transistor (of an individual memory cell) can represent one or more bits stored by the individual memory cell. When a charge is applied to the floating gate of the floating-gate transistor (of a memory cell), the charge remains "trapped" there due to the insulating properties of the surrounding materials, and this "trapped" charge alters the threshold voltage of the floating-gate transistor, which changes its conductive state. The threshold voltage determined for the floating-gate transistor translates to one or more bits of data stored on the memory cell and, as such, reading data from a memory cell can involve detecting the current threshold voltage of the memory cell.

Detecting the threshold voltage of memory cells of a wordline (e.g., corresponding to one or more pages) of a NAND-based memory device can involve performing a read strobe on the wordline. A read strobe can comprise applying a read voltage level (or read level) to a chosen wordline and sensing a response from applying the read voltage level, thereby obtaining sensed data that can be used to identify memory cells (of the chosen wordline) that have their respective threshold voltages below or above the applied read level. Performing a read operation on a NAND-based memory device to read data from one or more given memory cells of a chosen wordline can comprise performing (e.g., applying) one or more read strobes on the chosen wordline.

Each worldline (of a block) can define one or more pages depending on the type of memory cells (of the block) connected to the wordline. For example, for an SLC block, a single wordline can define a single page. For an MLC block, a single wordline can define two pages—a lower page (LP) and an upper page (UP). For a TLC block, a single wordline can define three pages—a lower page (LP), an upper page (UP), and an extra page (XP). For a QLC block, a single wordline can define four pages-a lower page (LP), an upper page (UP), an extra page (XP) and a top page (TP) page. As used herein, a page of LP page type can be referred to as a "LP page," a page of UP page type can be referred to as a "UP page," a page of XP page type can be referred to as a "XP page," and a page of TP page type can be referred to as a "TP page." Each page type can represent a different level of a cell (e.g., QLC can have a first level for LPs, a second level for UPs, a third level for XPs, and a fourth level for TPs). To write data to a given page, a wordline associated with the given page is programmed according to a page programming algorithm (e.g., that causes one or more voltage pulses or pulses to memory cells of a block based on the memory). Generally, programming a single wordline of a block results all the pages in the single wordline being programmed, where the number pages being programmed depends on the type of block. For example, programming a single wordline of a QLC block usually results in four pages (e.g., LP, UP, XP, TP pages) associated with the single wordline being programmed.

The latency of read error handling (REH) of memory systems (e.g., memory sub-systems) becomes more important as NAND-type memory devices scale and as performance requirements of managed memory systems (e.g., requirements of Universal Flash Store (UFS) have increased with each new version) increase. Generally, REH is needed to recover data when a NAND-type memory device experiences stress, which can impact performance of the NAND-type memory device (e.g., such as data retention). Higher REH latency can lead to command timeout or lower performance when the NAND-type memory device is under performance stress (e.g., media of the NAND-type memory device is under stress).

To improve REH latency, a coarse threshold estimate (CTE) calibration process can be performed on one or more read voltage levels (or read levels) of a NAND-type memory device. During the CTE calibration process, a failed bit count (CFBit) read can be performed on a page of the NAND-type memory device, which provides a CFBit value representing the number of bits on a right side of (e.g., the number of bits above) a given read voltage level of a read strobe. The CTE calibration process can use the CFBit information to adjust different read voltage levels while remaining within a threshold of a hard decode. The number of different read voltage levels used for the NAND-type memory device can depend on the type of page being read, such as a page of a SLC, MLC, TLC, or QLC block. For instance, a page of a TLC block can have read levels 0 (R0) to read level 7 (R7). An example of a CFBit read on a page of TLC block is illustrated and described with respect to FIG. 2.

In the CTE calibration process, sensing and CFBit value collection are usually performed on all read voltage levels, including read voltage levels known to be passing one or more CFBit criteria (also referred to herein read voltage levels that have converged). Generally, a NAND-type memory device (of a memory system) reports CFBit information on all read voltage levels for a target page type (e.g., LP, UP, XP, or TP page) being read. In scenarios where one or more read voltage levels are calibrated, a memory system can stop the CTE calibration process for the converged read voltage levels. Whenever the CTE feature is enabled, a NAND-type memory device will continue to report CFBit information for all read voltage levels even though one or more of those read voltage levels are already calibrated and ignored by the read error handling flow (because no further calibration is needed with respect to those calibrated read voltage levels). The collection and reporting of CFBit information for calibrated read voltage levels is unnecessary and adds latency to the NAND-type memory device and the memory system, which can impact their overall performance.

Various embodiments cure these and other deficiencies of conventional memory technologies. In particular, various embodiments provide for performing a read voltage level calibration process with selective skipping collection of calibration-related information on a memory device (e.g., NOT-AND (NAND)-type memory device) of a memory system, such as a memory sub-system. For example, some embodiments provide for performing a CTE calibration, with selective skipping of CFBit information collection, on a memory system (e.g., memory sub-system 110 of FIG. 1). According to some embodiments, a read-level-skip coarse threshold estimate (CTE) read is used to collect calibration-related information (e.g., CFBit information) for a set of read voltage levels while selectively skipping all other read voltage levels. Depending on the embodiment, a read-level-skip coarse threshold estimate read feature can be accessed through a command (e.g., a CFBit read command), where a memory device (e.g., NAND-type memory device) receives (e.g., as input) a parameter (e.g., configuration parameter) that describes a select set of read voltage levels for which calibration-related information (e.g., CFBit information) is collected (e.g., collected by performing a sense, CFBit count, and report CFBit count information).

According to some embodiments, a read-level-skip coarse threshold estimate read described herein is used by an error handle process or flow that is triggered in response to an error detected during the execution of a command or operation on a memory device, such as a read operation performed on a page of a block of the memory device based on a host read command. For example, the error handling process/flow can perform a calibration process (e.g., CTE calibration process), which can perform the read-level-skip coarse threshold estimate read with a parameter that selects which read voltage levels will be sensed and have read voltage level calibration information (e.g., CFBit information) collected. For instance, a 3-bit parameter (e.g., for performing a read on a page of a TLC block) or a 4-bit parameter (e.g., for performing a read on a page of a QLC block) can be sent with a coarse threshold estimate read. The 3-bit parameter for reading a select page of a TLC block can represent the read voltage levels being read based on the page type of the select page (e.g., a lower page (LP) type, a upper page (UP) type, or an extra page (XP) type). For example, read voltage levels 2-4-6 for a page that is a upper page (UP) can correspond to bits 1-2-3 of the parameter respectively, and the memory device will skip sensing and information collection of unwanted read voltage levels based on the 3-bit parameter. The parameter can be sent with the coarse threshold estimate read in a same cycle as a CTE enable bit of a read command/operation (that enables a read command/operation to be a coarse threshold estimate read). By parameter (describing the read voltage level configuration to be used for coarse threshold estimate) in the same address cycle as the CTE enable bit, various embodiments can avoid additional command latency for implementing a read-level-skip coarse threshold estimate read. For some embodiments, calling the coarse threshold estimate read without the parameter can result in sensing and read voltage level information collection for all read voltage levels applicable to a select page of a block of a memory device.

Through use of various embodiments, a memory system can skip unnecessary sensing and collection of calibration-related information (e.g., CFBit information collection) during a read voltage level calibration process (e.g., CTE calibration process), which can result in a reduction in latency, power consumption, or both within the memory system during the read level calibration. The use of various embodiments permits an error handling (e.g., read-error handling) flow to focus read voltage level calibration on only uncalibrated (e.g., failing) read voltage levels, thereby permitting those read voltage levels to calibrate faster (e.g., converge faster to a set of target criteria, such as CFBit target counts and correct voltage distribution valley), which can improve latency for situations that require multiple loops of calibration and deeper error handling. Additionally, the reduced latency provided by various embodiments can help to reduce the possibility of memory system command timeout.

Disclosed herein are some examples of performing a read voltage level calibration process with selective skipping collection of calibration-related information on a memory device of a memory system, such as a memory sub-system.

Figure 1:
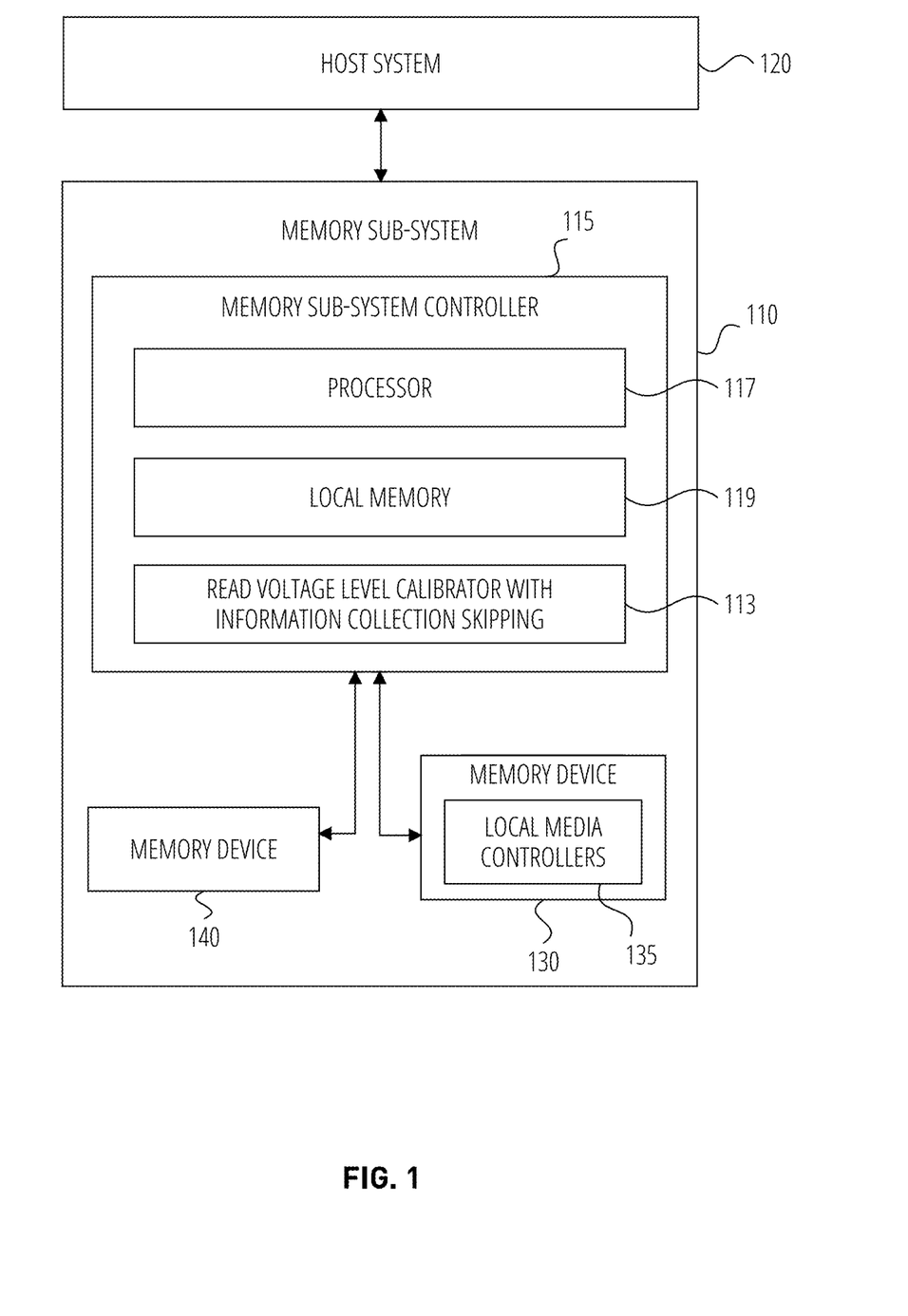
FIG. 1 is a block diagram illustrating an example computing system that includes a memory sub-system, in accordance with some embodiments of the present disclosure.

FIG. 1 illustrates an example computing system 100 that includes a memory sub-system 110, in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, a secure digital (SD) card, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-systems 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., NVDIMM controller), and a storage protocol controller (e.g., a peripheral component interconnect express (PCIe) controller, serial advanced technology attachment (SATA) controller). The host system 120 uses the memory sub-system 110, for example, to write data to the memory sub-system 110 and read data from the memory sub-system 110.

The host system 120 can include or be coupled to the memory sub-system 110 so that the host system 120 can read data from or write data to the memory sub-system 110. The host system 120 can be coupled to the memory sub-system 110 via a physical host interface. Examples of a physical host interface include, but are not limited to, a serial advanced technology attachment (SATA) interface, a peripheral component interconnect express (PCIe) interface, a compute express link (CXL) interface, a universal serial bus (USB) interface, a Fibre Channel interface, a Serial Attached SCSI (SAS) interface, etc. The physical host interface can be used to transmit data between the host system 120 and the memory sub-system 110. The host system 120 can further utilize an NVM Express (NVMe) interface to access the memory devices 130, 140 when the memory sub-system 110 is coupled with the host system 120 by the PCIe or CXL interface. The physical host interface can provide an interface for passing control, address, data, and other signals between the memory sub-system 110 and the host system 120.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a NAND type flash memory and write-in-place memory, such as a three-dimensional (3D) cross-point memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional (2D) NAND and 3D NAND.

Each of the memory devices 130, 140 can include one or more arrays of memory cells. One type of memory cell, for example, SLCs, can store one bit per cell. Other types of memory cells, such as MLCs, TLCs, QLCs, and penta-level cells (PLCs), can store multiple bits per cell. In some embodiments, each of the memory devices 130, 140 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130, 140 can be grouped as pages that can refer to a logical unit of the memory device used to store data. With some types of memory (e.g., NAND), pages can be grouped to form blocks. As used herein, a block comprising SLCs can be referred to as a SLC block, a block comprising MLCs can be referred to as a MLC block, a block comprising TLCs can be referred to as a TLC block, and a block comprising QLCs can be referred to as a QLC block.

Although non-volatile memory components such as NAND type flash memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide-based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide-based RRAM (OxRAM), negative-or (NOR) flash memory, and electrically erasable programmable read-only memory (EEPROM).

A memory sub-system controller 115 (or controller 115 for simplicity) can communicate with the memory devices 130, 140 to perform operations such as reading data, writing data, or erasing data at the memory devices 130, 140 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, and so forth. The local memory 119 can also include ROM for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device 130 and/or the memory device 140. The memory sub-system controller 115 can be responsible for other operations such as wear leveling operations, garbage collection operations, error detection and ECC operations, encryption operations, caching operations, and address translations between a logical address (e.g., LBA, namespace) and a physical memory address (e.g., physical block address) that are associated with the memory devices 130, 140. The memory sub-system controller 115 can further include host interface circuitry to communicate with the host system 120 via the physical host interface. The host interface circuitry can convert the commands received from the host system 120 into command instructions to access the memory device 130 and/or the memory device 140 as well as convert responses associated with the memory device 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130, 140.

In some embodiments, the memory device 130 includes local media controllers 135 that operate in conjunction with memory sub-system controller 115 to execute operations on one or more memory cells of the memory device 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local media controller 135) for media management within the same memory device package. An example of a managed memory device is a managed NAND (MNAND) device.

The memory sub-system controller 115 includes a read voltage level calibrator with information collection skipping 113 (hereafter, the read voltage level calibrator 113) that enables or facilitates the memory sub-system controller 115 to perform read voltage level calibration with information collection skipping (e.g., CTE calibration with selective skipping of CFBit information collection) on the memory device 130 or 140 of the memory sub-system 110. Alternatively, some or all of the read voltage level calibrator 113 is included by the local media controller 135, thereby enabling the local media controller 135 to perform read voltage level calibration with information collection skipping (e.g., CTE calibration with selective skipping of CFBit information collection) on the memory device 130 of the memory sub-system 110.

Figure 2:
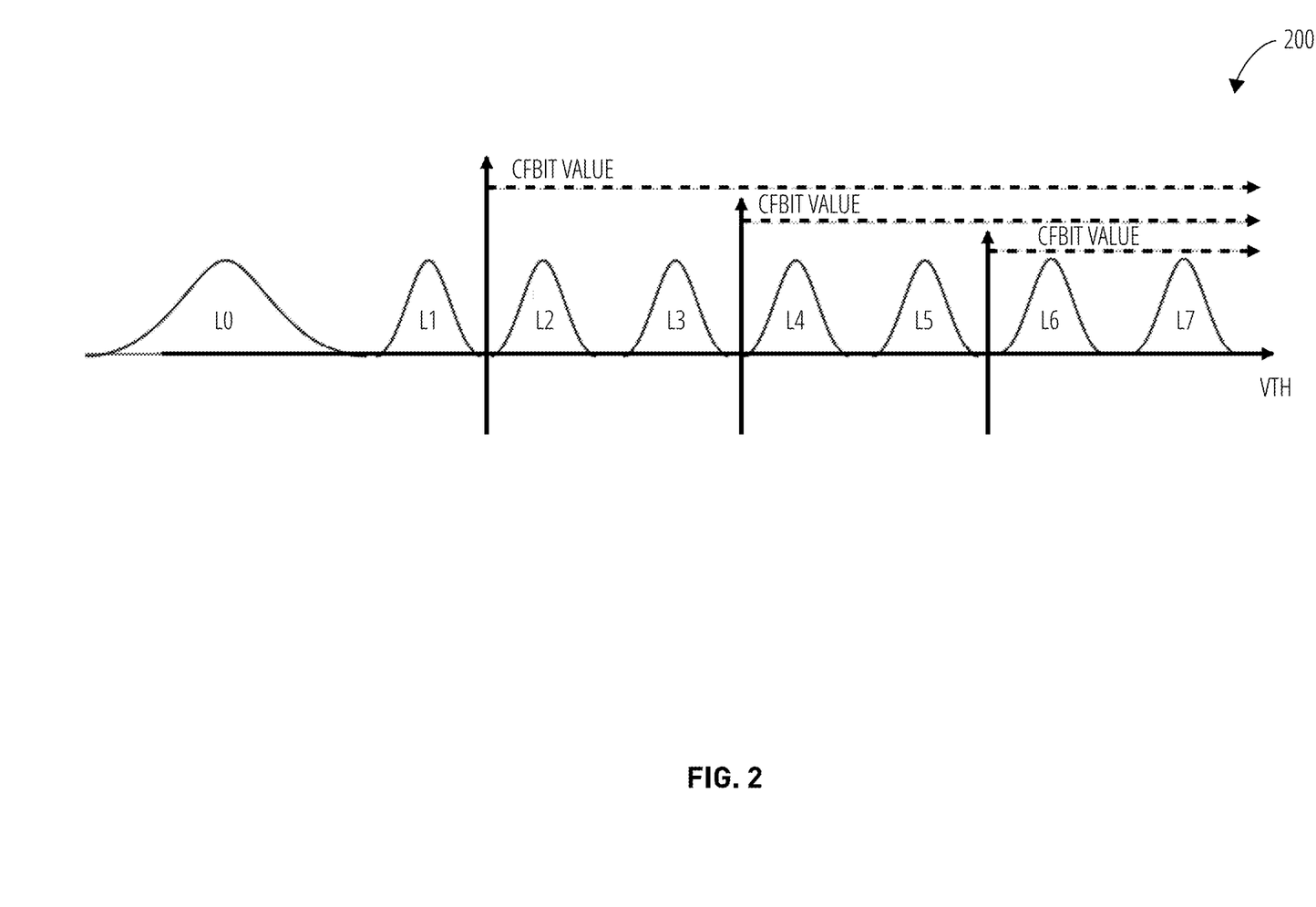
FIG. 2 provides a graph illustrating an example of a CFBit read on a page of TLC block, in accordance with some embodiments of the present disclosure.

FIG. 2 provides a graph 200 illustrating an example of a CFBit read on a page of TLC block, in accordance with some embodiments of the present disclosure. In particular, the graph 200 illustrates a CFBit read performed at three different read voltage levels (or read levels) with respect to different voltage distributions valleys of a memory cell of a TLC block-read level 2 (R2), read level 4 (R4), and read level 6 (R6), which results in a CFBit value based on each of those read levels.

Figure 3A:
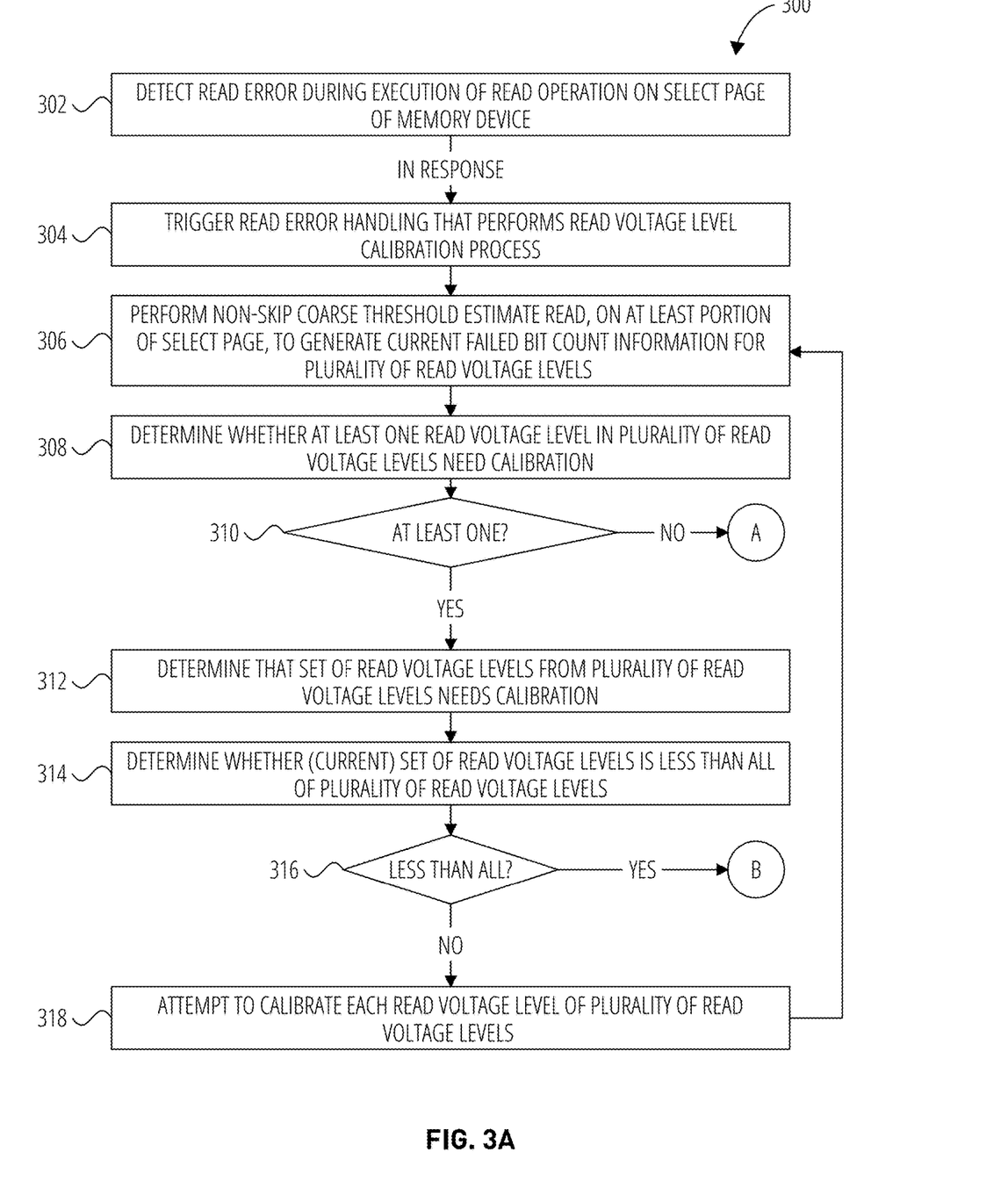
FIG. 3A and FIG. 3B are flow diagrams of an example method for performing a read voltage level calibration process with selective skipping collection of calibration-related information on a memory device of a memory system, in accordance with some embodiments of the present disclosure.
Figure 3B:
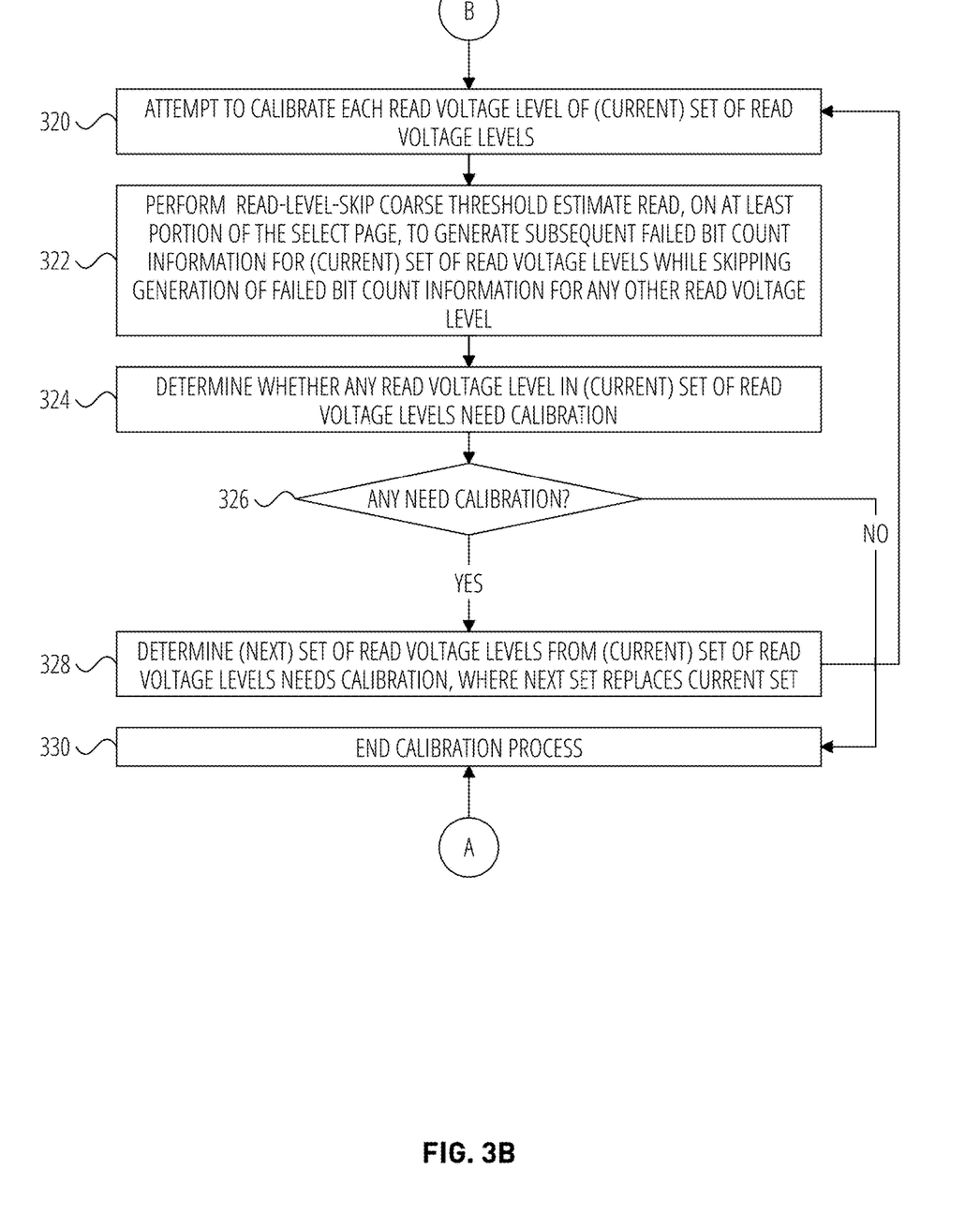

FIG. 3A and FIG. 3B are flow diagrams of an example method 300 for performing a read voltage level calibration process with selective skipping collection of calibration-related information on a memory device of a memory system, in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the memory sub-system controller 115 of FIG. 1 based on the read voltage level calibrator 113. Additionally, or alternatively, for some embodiments, the method 300 is performed, at least in part, by the local media controller 135 of the memory device 130 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are used in every embodiment. Other process flows are possible.

Referring now to the method 300 of FIG. 3A, at operation 302 a processing device (e.g., the processor 117 of the memory sub-system controller 115) detects a read error during execution of a read operation on a select page of a select block of a memory device (e.g., 130) of a memory system (e.g., memory sub-system 110). The read error can comprise a decoding error occurred during the read operation, and the read error can further indicate that CTE error handling is needed to address the read error. In response to detecting the read error, at operation 304, the processing device triggers a read error handling process (or flow) to handle the read error, where the read error handling process comprises performing a read voltage level calibration process, such as a CTE calibration process. After operation 304, the method 300 proceeds to operation 306.

According to various embodiments, operations 306 through 330 represent those of the read voltage level calibration process. Additionally, one or more of operations 306 through 318 can represent operations performed during a non-skip iteration of the read voltage level process, where sensing and collection of calibration-related information (e.g., CFBit information) is performed for all read voltage levels associated with the select page. For instance, where the select page is a upper page (UP) type of a TLC block, the non-skip iteration would sense and collect calibration-related information for all of the associated read voltage levels-read voltage levels 2, 4, and 6 (R2, R4, and R6 respectively). Operations 320 through 328 can represent operations performed during a read-level-skip iteration of the read voltage level process, where sensing and collection of calibration-related information (e.g., CFBit information) is performed for only select read voltage levels associated with the select page (e.g., select only those read voltage levels that need calibration).

At operation 306, the processing device performs, on at least a portion of the select page, a non-skip coarse threshold estimate read to generate current calibration-related information for a plurality of read voltage levels associated with the select page, where the plurality of read voltage levels represents all read voltage levels associated with the select page. For some embodiments, the plurality of read voltage levels is determined based on a page type of the select page. Example page types can include, without limitation, a lower page (LP), an upper page (UP), an extra page (XP), or a top page (TP). For instance, the plurality of read voltage levels comprises read voltage levels R2, R4, and R6 for where the select page is a UP of a TLC block. For various embodiments, the no-skip coarse threshold estimate read comprises a CFBit read configured to generate calibration-related information for all read voltage levels associated with a given page. Additionally, for various embodiments, the current calibration-related information (generated by the non-skip coarse threshold estimate read) comprises CFBit information.

Based on the current calibration-related information (generated at operation 306), at operation 308, the processing device determines whether at least one read voltage level in the plurality of read voltage levels need calibration. During operation 308, the processing device can determine which of the plurality of read voltage levels (if any) need calibration. The processing device can determine that a given read voltage level (of the plurality of read voltage levels) need calibration when calibration-related information (e.g., CFBit information) for the given read voltage level indicates that the given read voltage level fails to satisfy a calibration criterion (e.g., CFBit target criterion). At decision block 310, in response to the processing device determining that no read voltage level of the plurality of read voltage levels needs calibration, the method 300 proceeds to operation 330, where the processing device ends the read voltage level calibration process. Alternatively, at decision block 310, in response to the processing device determining that at least one read voltage level of the plurality of read voltage levels needs calibration, the method 300 proceeds to operation 312.

At operation 312, the processing device determines that a set of read voltage levels from the plurality of read voltage levels needs calibration and, at operation 314, the processing device determines whether the (current) set of read voltage levels is less than all of the plurality of read voltage levels (e.g., only those read voltage levels in the plurality that need calibration). At decision block 316, in response to determining the processing device that the set of read voltage levels is not less than all of the plurality of read voltage levels (meaning each read voltage level of the plurality of read voltage levels needs calibration), the method 300 proceeds to operation 318. Alternatively, at decision block 316, in response to determining the processing device that the set of read voltage levels is less than all of the plurality of read voltage levels, the method 300 proceeds to operation 320.

During operation 318, the processing device attempts to calibrate the set of read voltage levels by adjusting a set of read voltage level offsets that corresponds to the set of read voltage levels. For example, the processing device can use the calibration-related information (generated at operation 306) to determine the adjustment to the set of read voltage level offsets. An adjustment to an offset for a given read voltage level can be determined based on a difference between calibration-related information (e.g., CFBit information) and a calibration criterion (e.g., CFBit target criterion). After the calibration attempt, the method 300 returns to operation 306, which enables the processing device to redetermine whether at least one read voltage level in the plurality of read voltage levels need further calibration (e.g., by way of offset adjustment).

For operation 320, the processing device attempts to calibrate the set of read voltage levels (which represents less than all read voltage levels of the plurality of read voltage levels) by adjusting a set of read voltage level offsets that corresponds to the set of read voltage levels. For example, the processing device can use the calibration-related information (generated at operation 306) to determine the adjustment to the set of read voltage level offsets. As described herein, an adjustment to an offset for a given read voltage level can be determined based on a difference between calibration-related information (e.g., CFBit information) and a calibration criterion (e.g., CFBit target criterion).

Referring now to FIG. 3B, from operation 320, the method 300 proceeds to operation 322, where the processing device performs, on at least the portion of the select page, a read-level-skip coarse threshold estimate read to generate subsequent calibration-related information for the set of read voltage levels while skipping generation of calibration-related information for any other read voltage level. In this way, the read-level-skip coarse threshold estimate read can sense and collect calibration information (e.g., CFBit information) for select read voltage levels while skipping the sensing and collection of calibration information for any other (unnecessary) read voltage level. For some embodiments, the read-level-skip coarse threshold estimate read comprises a CFBit read configured to receive a parameter (e.g., 3-bit parameter for a page of a TLC block, or 4-bit parameter for a page of a QLC block) that selects one or more read voltage levels for which the CFBit read generates calibration-related information. Additionally, for some embodiments, the subsequent calibration-related information (generated by the read-level-skip coarse threshold estimate read) comprises CFBit information.

Based on the subsequent calibration-related information (generated at operation 322), at operation 324, the processing device determines whether at least one read voltage level in the (current) set of read voltage levels need calibration.

During operation 324, the processing device can determine which of the (current) set of read voltage levels (if any) need calibration. The processing device can determine that a given read voltage level (of the set of read voltage levels) need calibration when calibration-related information (e.g., CFBit information) for the given read voltage level indicates that the given read voltage level fails to satisfy a calibration criterion (e.g., CFBit target criterion).

At decision block 326, in response to the processing device determining that no read voltage level of the plurality of read voltage levels needs calibration, the method 300 proceeds to operation 330, where the processing device ends the read voltage level calibration process. Alternatively, at decision block 326, in response to the processing device determining that at least one read voltage level of the (current) set of read voltage levels needs calibration, the method 300 proceeds to operation 328.

At operation 328, the processing device determines that a next set of read voltage levels from the current set of read voltage levels needs calibration, where the next set of read voltage levels replaces the current set of read voltage levels for next operation of the method 300. The next set of read voltage levels can include all or less than all the read voltage levels of the current set of read voltage levels. For instance, where the current set of read voltage levels comprises R2, R4, and R6 and each of the three read voltage levels still need calibration, the next set of read voltage levels will comprise R2, R4, and R6. Subsequently, the method 300 returns to operation 320, where the processing device reperforms, on at least the portion of the select page, the read-level-skip coarse threshold estimate read to regenerate (new) subsequent calibration-related information for the current set of read voltage levels (after being replaced by the new set of read voltage levels) while skipping generation of calibration-related information for any other read voltage level.

Figure 4A:
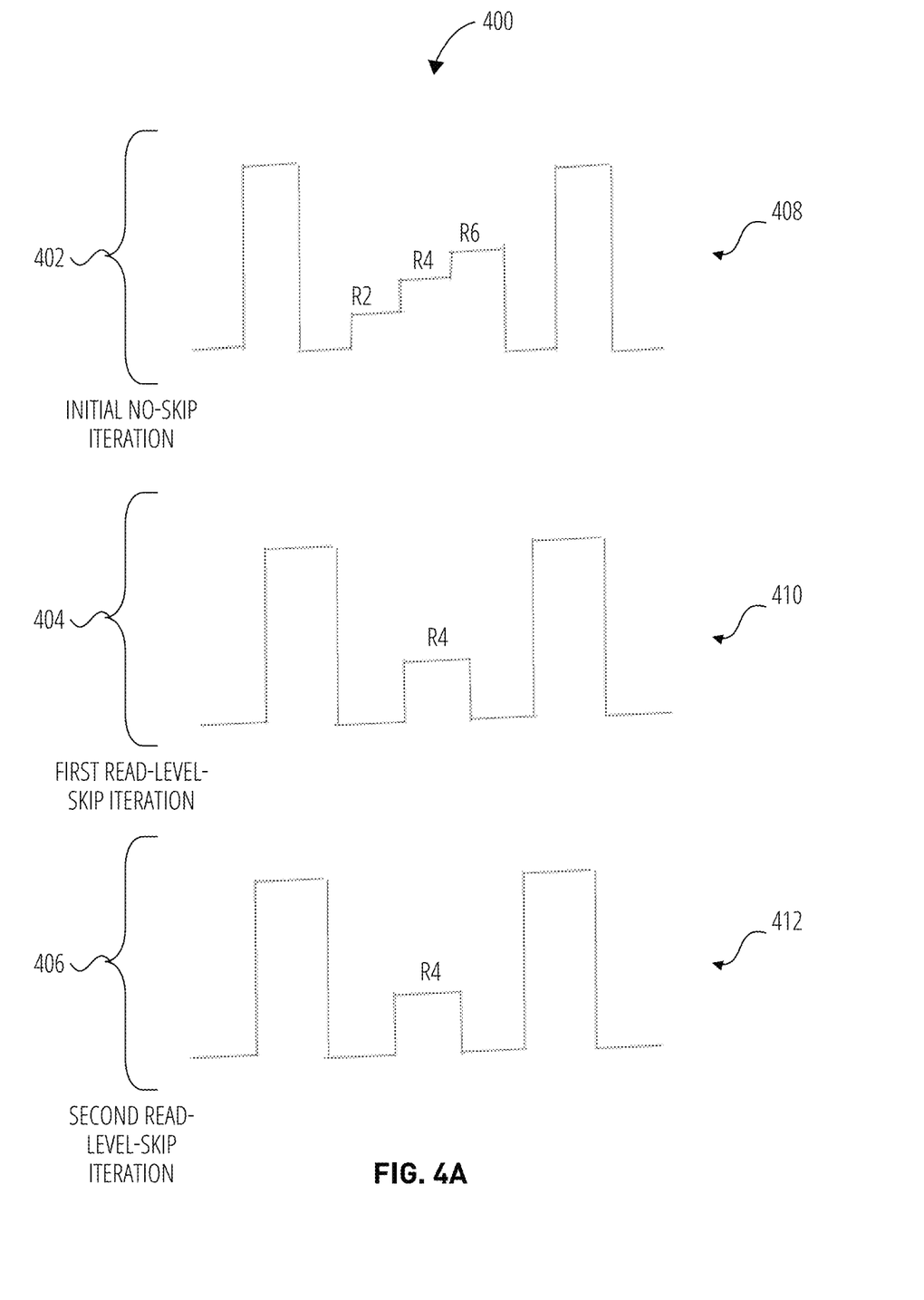
FIG. 4A and FIG. 4B are diagrams illustrating execution of an example method for performing a read voltage level calibration process with selective skipping collection of calibration-related information on a memory device of a memory system, in accordance with some embodiments of the present disclosure.
Figure 4B:
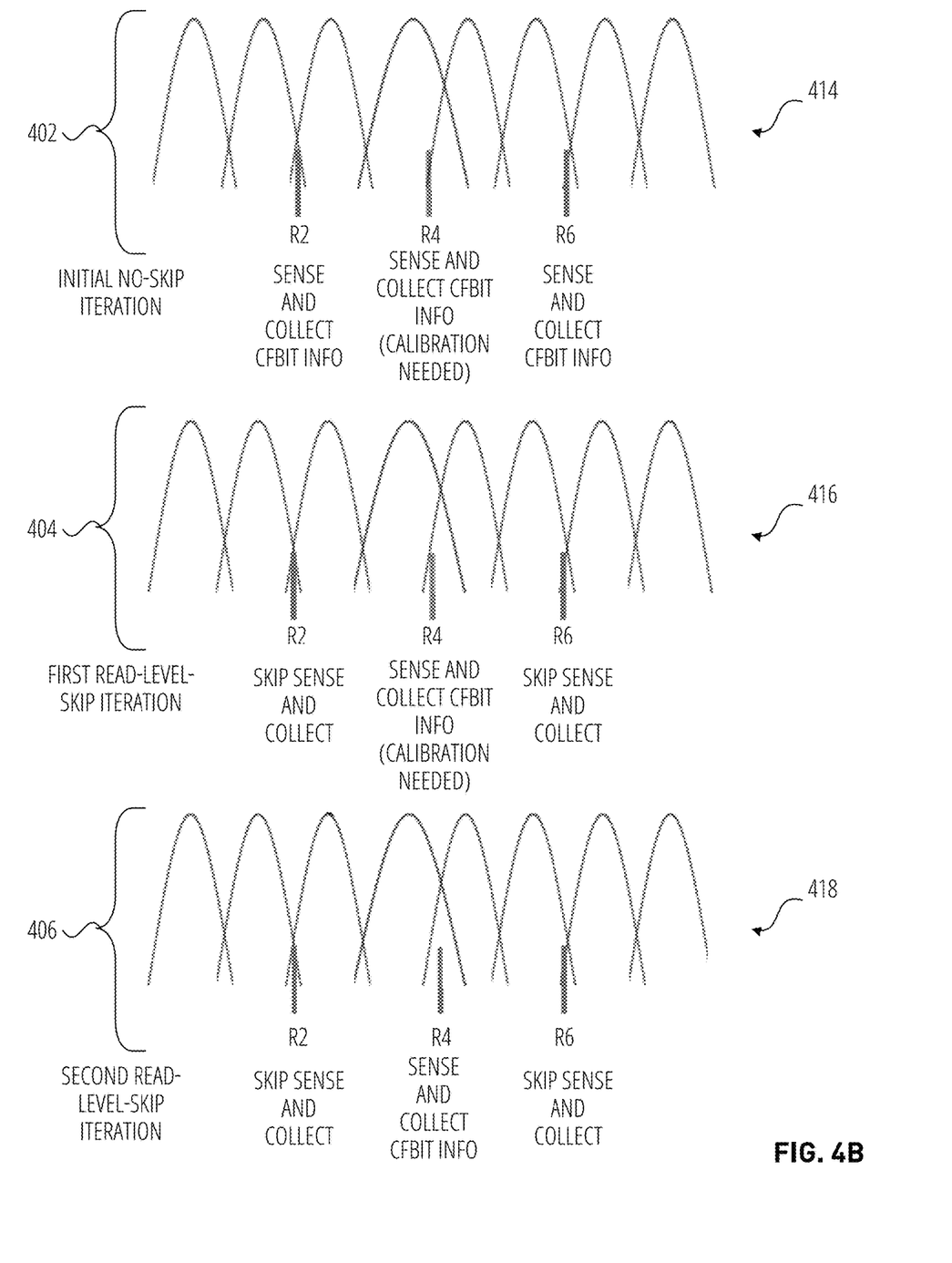

FIG. 4A and FIG. 4B are diagrams illustrating execution of an example method for performing a read voltage level calibration process with selective skipping collection of calibration-related information on a memory device of a memory system, in accordance with some embodiments of the present disclosure. In particular, the diagrams of FIG. 4A illustrate example calibration process iterations 400 of a CTE calibration process of some embodiments being performed on an upper page (UP) of a TLC block, and the diagrams of FIG. 4B illustrate the example read voltage levels being calibrated during the calibration process iterations 400. A memory system (e.g., memory sub-system 110) performs a read operation on the upper page and decoding indicates that CTE error handling is needed to read data from the upper page. Accordingly, the CTE calibration process illustrated by FIG. 4A and FIG. 4B is triggered. Overall, FIG. 4A and FIG. 4B illustrate how after an initial no-skip iteration 402 of the CTE calibration process, the CTE calibration process determines that R2 and R6 meet one or more target criteria (e.g., converged on target), and only R4 needs further calibration (between the initial no-skip iteration 402 and a first read-level-skip iteration 404, and between the first read-level-skip iteration 404 and a second read-level-skip iteration 406).

Referring now to FIG. 4A, the no-skip iteration 402 of the CTE calibration process, the memory system issues a no-skip coarse threshold estimate read (e.g., no-skip CFBit read), which causes CFBit information (graph 408) to be returned for all read voltage levels associated with the upper page—R2, R4, and R6. As shown by graph 414 on FIG. 4B, each of R2, R4, and R6 are sensed and CFBit information is collected for each of R2, R4, and R6. Based on the CFBit information collected for each of R2, R4, and R6, the memory system determines that R2 and R6 meet one or more target criteria (e.g., have converged on target), but R4 does not meet the one or more target criteria and needs calibration.

Accordingly, the memory system adjusts the offset of R4 and enters the first read-level-skip iteration 404, during which the memory system issues a read-level-skip coarse threshold estimate read (e.g., CFBit read with a parameter that causes read-level-skip) that causes CFBit information (graph 410) to be returned for only R4 while skipping the sensing and collection of CFBit information for R2 and R6. As shown by graph 416 on FIG. 4B, R4 is sensed and CFBit information is collected for R4, while sense and collection are skipped for R2 and R6. Based on this CFBit information last collected for R4, the memory system determines that R4 still does not meet the one or more target criteria and needs further calibration.

As such, the memory system adjusts the offset of R4 again and enters the second read-level-skip iteration 406, during which the memory system issues a read-level-skip coarse threshold estimate read (e.g., CFBit read with a parameter that causes read-level-skip) that causes CFBit information (graph 412) to be returned for only R4 again while skipping the sensing and collection of CFBit information for R2 and R6. As shown by graph 418 on FIG. 4B, R4 is sensed and CFBit information is collected for R4, while sense and collection are skipped for R2 and R6. Based on this CFBit information last collected for R4, the memory system determines that R4 now meets the one or more target criteria (e.g., converges on target). After this point, the CTE calibration process can end.

Figure 5:
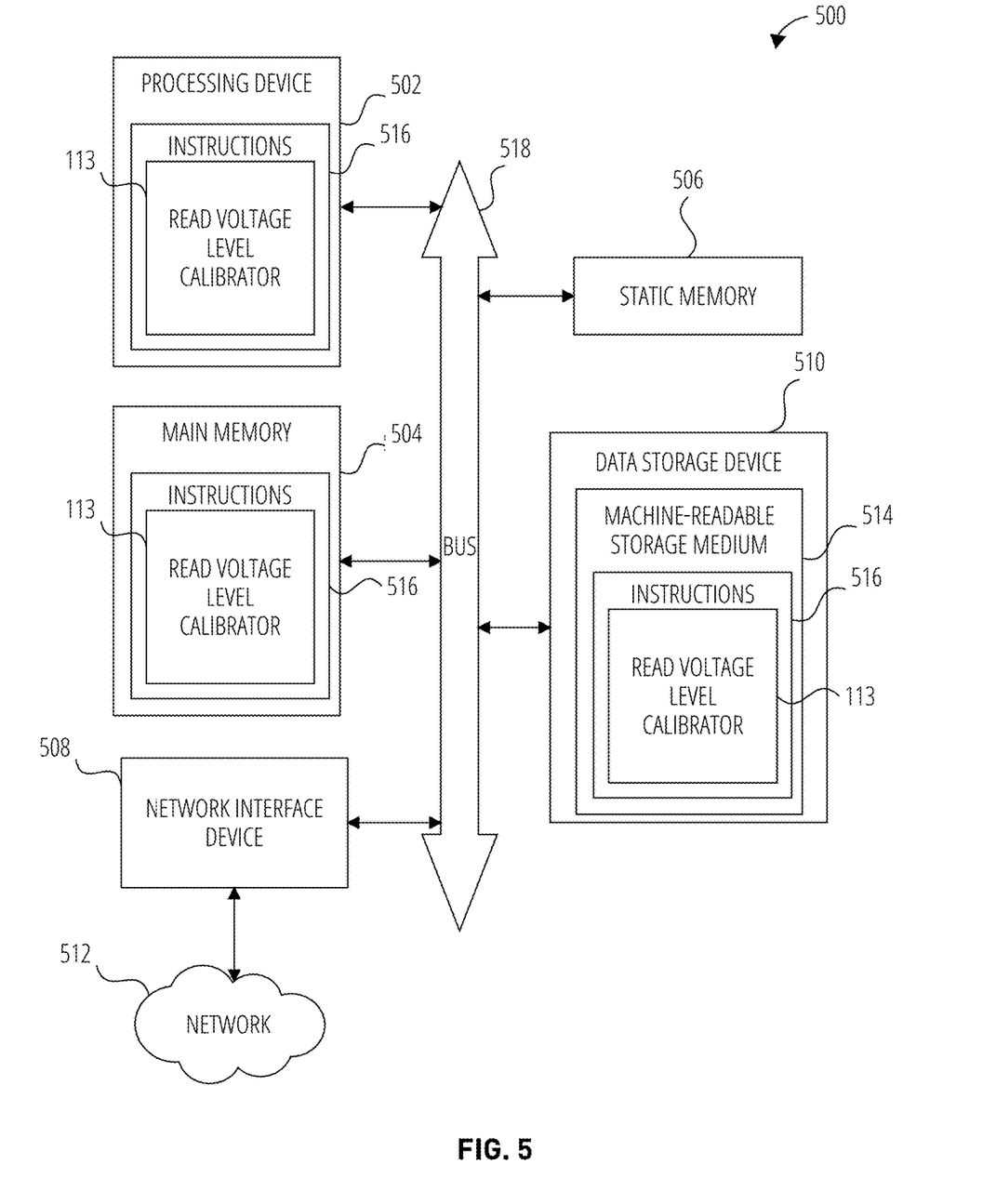
FIG. 5 is a block diagram of an example computer system in which embodiments of the present disclosure may operate.

FIG. 5 illustrates an example machine in the form of a computer system 500 within which a set of instructions can be executed for causing the machine to perform any one or more of the methodologies discussed herein. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations described herein. In alternative embodiments, the machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., ROM, flash memory, DRAM such as SDRAM or Rambus DRAM (RDRAM), etc.), a static memory 506 (e.g., flash memory, static random access memory (SRAM), etc.), and a data storage device 510, which communicate with each other via a bus 518.

The processing device 502 represents one or more general-purpose processing devices such as a microprocessor, a central processing unit, or the like. More particularly, the processing device 502 can be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 502 can also be one or more special-purpose processing devices such as an application-specific integrated circuit (ASIC), a field programmable gate array (FPGA), a digital signal processor (DSP), a network processor, or the like. The processing device 502 is configured to execute instructions 516 for performing the operations and steps discussed herein. The computer system 500 can further include a network interface device 508 to communicate over a network 512.

The data storage device 510 can include a machine-readable storage medium 514 (also known as a computer-readable medium) on which is stored one or more sets of instructions 516 or software embodying any one or more of the methodologies or functions described herein. The instructions 516 can also reside, completely or at least partially, within the main memory 504 and/or within the processing device 502 during execution thereof by the computer system 500, the main memory 504 and the processing device 502 also constituting machine-readable storage media. The machine-readable storage medium 514, data storage device 510, and/or main memory 504 can correspond to the memory sub-system 110 of FIG. 1.

In one embodiment, the instructions 516 include instructions to implement CTE calibration, with selective skipping of CFBit information collection, on a memory system as described herein (e.g., the read voltage level calibrator 113 of FIG. 1). While the machine-readable storage medium 514 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Described implementations of the subject matter can include one or more features, alone or in combination as illustrated below by way of examples.

Example 1 is a system comprising: a memory device; and a processing device, operatively coupled to the memory device, configured to perform operations comprising: performing a non-skip iteration of a read voltage level calibration process on a select page of a select block of the memory device, the non-skip iteration comprising: performing, on at least a portion of the select page, a non-skip coarse threshold estimate read to generate current calibration-related information for a plurality of read voltage levels associated with the select page, the plurality of read voltage levels representing all read voltage levels associated with the select page; based on the current calibration-related information, determining whether at least one read voltage level in the plurality of read voltage levels need calibration; and in response to determining that a set of read voltage levels from the plurality of read voltage levels needs calibration and that the set of read voltage levels is less than all of the plurality of read voltage levels, performing a skip iteration of the read voltage level calibration process that comprises: attempting to calibrate the set of read voltage levels by adjusting a set of read voltage level offsets that corresponds to the set of read voltage levels; and performing, on at least the portion of the select page, a read-level-skip coarse threshold estimate read to generate subsequent calibration-related information for the set of read voltage levels while skipping generation of calibration-related information for any other read voltage level.

In Example 2, the subject matter of Example 1 includes, wherein the non-skip iteration comprises: in response to determining that all read voltage levels in the plurality of read voltage levels need calibration: attempting to calibrate the plurality of read voltage levels by adjusting a plurality of read voltage level offsets that corresponds to the plurality of read voltage levels; and reperforming the non-skip iteration of the calibration process.

In Example 3, the subject matter of Examples 1-2 includes, wherein the set of read voltage levels is a first set of read voltage levels, wherein the subsequent calibration-related information is first calibration-related information, wherein the set of read voltage level offsets is a first set of read voltage level offsets for the first set of read voltage levels, and wherein the skip iteration is a first skip iteration, and wherein the first skip iteration comprises: based on the subsequent calibration-related information, determining whether at least one read voltage level in the first set of read voltage levels need calibration; and in response to determining that a second set of read voltage levels from the first set of read voltage levels needs calibration: attempting to calibrate the second set of read voltage levels by adjusting a second set of read voltage level offsets that corresponds to the second set of read voltage levels; and performing a second skip iteration of the read voltage level calibration process that performs the read-level-skip coarse threshold estimate read to generate second calibration-related information for the second set of read voltage levels while skipping generation of failed bit count information for any other read voltage level.

In Example 4, the subject matter of Example 3 includes, wherein the first skip iteration comprises: in response to determining that no read voltage level in the first set of read voltage levels needs calibration, ending the read voltage level calibration process.

In Example 5, the subject matter of Examples 1-4 includes, wherein the read-level-skip coarse threshold estimate read comprises a coarse threshold estimate read configured to receive a parameter, the parameter selecting one or more read voltage levels for which the coarse threshold estimate read generates calibration-related information.

In Example 6, the subject matter of Example 5 includes, wherein the parameter comprises a three-bit parameter for selecting one or more read voltage levels voltages associated with one of a lower page (LP), an upper page (UP), or an extra page (XP) of a triple-level cell (TLC) block of the memory device.

In Example 7, the subject matter of Examples 5-6 includes, wherein the parameter comprises a four-bit parameter for selecting one or more read voltage levels voltages associated with one of a lower page (LP), an upper page (UP), an extra page (XP), or a top page (TP) of a quad-level cell (QLC) block of the memory device.

In Example 8, the subject matter of Examples 1-7 includes, wherein the operations comprise: detecting a read error during execution of a read operation on the select page; and in response to detecting the read error, triggering a read error handling process that performs the read voltage level calibration process.

In Example 9, the subject matter of Examples 1-8 includes, wherein the plurality of read voltage levels is determined based on a page type of the select page.

In Example 10, the subject matter of Example 9 includes, wherein the page type comprises at least one of a lower page (LP), an upper page (UP), an extra page (XP), or a top page (TP).

In Example 11, the subject matter of Examples 1-10 includes, wherein the read-level-skip coarse threshold estimate read comprises a failed bit count (CFBit) read configured to receive a parameter that selects one or more read voltage levels for which the CFBit read generates calibration-related information.

In Example 12, the subject matter of Examples 1-11 includes, wherein the read voltage level calibration process comprises a coarse threshold estimate (CTE) process.

In Example 13, the subject matter of Examples 1-12 includes, wherein the current calibration-related information comprises failed bit count information.

In Example 14, the subject matter of Examples 1-13 includes, wherein the subsequent calibration-related information comprises failed bit count information.

Example 15 is a method to implement any of Examples 1-14.

Example 16 is at least one machine-readable medium comprising instructions that, when executed by a processing device, cause the processing device to perform operations to implement any of Examples 1-14.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer-readable storage medium, such as, but not limited to, any type of disk including floppy disks, optical disks, CD-ROMs, and magnetic-optical disks, ROMs, RAMs, EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium (such as a non-transitory machine-readable medium) having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a ROM, RAM, magnetic disk storage media, optical storage media, flash memory components, and so forth. A machine-readable storage medium can be non-transitory (in other words, not having any transitory signals) in that it does not embody a propagating signal. However, labeling a machine-readable storage medium "non-transitory" should not be construed to mean that the machine-readable storage medium is incapable of movement; the machine-readable storage medium should be considered as being transportable from one physical location to another.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

The invention claimed is:

1. A system comprising:
a memory device; and
a processing device, operatively coupled to the memory device, configured to perform operations comprising:
performing a non-skip iteration of a read voltage level calibration process on a select page of a select block of the memory device, the non-skip iteration comprising:
performing, on at least a portion of the select page, a non-skip coarse threshold estimate read to generate current calibration-related information for a plurality of read voltage levels associated with the select page, the plurality of read voltage levels representing all read voltage levels associated with the select page;
based on the current calibration-related information, determining whether at least one read voltage level in the plurality of read voltage levels need calibration; and
in response to determining that a set of read voltage levels from the plurality of read voltage levels needs calibration and that the set of read voltage levels is less than all of the plurality of read voltage levels, performing a skip iteration of the read voltage level calibration process that comprises:
attempting to calibrate the set of read voltage levels by adjusting a set of read voltage level offsets that corresponds to the set of read voltage levels; and
performing, on at least the portion of the select page, a read-level-skip coarse threshold estimate read to generate subsequent calibration-related information for the set of read voltage levels while skipping generation of calibration-related information for any other read voltage level.

2. The system of claim 1, wherein the non-skip iteration comprises:
in response to determining that all read voltage levels in the plurality of read voltage levels need calibration:
attempting to calibrate the plurality of read voltage levels by adjusting a plurality of read voltage level offsets that corresponds to the plurality of read voltage levels; and
reperforming the non-skip iteration of the calibration process.

3. The system of claim 1, wherein the set of read voltage levels is a first set of read voltage levels, wherein the subsequent calibration-related information is first calibration-related information, wherein the set of read voltage level offsets is a first set of read voltage level offsets for the first set of read voltage levels, and wherein the skip iteration is a first skip iteration, and wherein the first skip iteration comprises:
based on the subsequent calibration-related information, determining whether at least one read voltage level in the first set of read voltage levels need calibration; and
in response to determining that a second set of read voltage levels from the first set of read voltage levels needs calibration:
attempting to calibrate the second set of read voltage levels by adjusting a second set of read voltage level offsets that corresponds to the second set of read voltage levels; and
performing a second skip iteration of the read voltage level calibration process that performs the read-level-skip coarse threshold estimate read to generate second calibration-related information for the second set of read voltage levels while skipping generation of failed bit count information for any other read voltage level.

4. The system of claim 3, wherein the first skip iteration comprises:
in response to determining that no read voltage level in the first set of read voltage levels needs calibration, ending the read voltage level calibration process.

5. The system of claim 1, wherein the read-level-skip coarse threshold estimate read comprises a coarse threshold estimate read configured to receive a parameter, the parameter selecting one or more read voltage levels for which the coarse threshold estimate read generates calibration-related information.

6. The system of claim 5, wherein the parameter comprises a three-bit parameter for selecting one or more read voltage levels voltages associated with one of a lower page (LP), an upper page (UP), or an extra page (XP) of a triple-level cell (TLC) block of the memory device.

7. The system of claim 5, wherein the parameter comprises a four-bit parameter for selecting one or more read voltage levels voltages associated with one of a lower page (LP), an upper page (UP), an extra page (XP), or a top page (TP) of a quad-level cell (QLC) block of the memory device.

8. The system of claim 1, wherein the operations comprise:
   detecting a read error during execution of a read operation on the select page; and
   in response to detecting the read error, triggering a read error handling process that performs the read voltage level calibration process.

9. The system of claim 1, wherein the plurality of read voltage levels is determined based on a page type of the select page.

10. The system of claim 9, wherein the page type comprises at least one of a lower page (LP), an upper page (UP), an extra page (XP), or a top page (TP).

11. The system of claim 1, wherein the read-level-skip coarse threshold estimate read comprises a failed bit count (CFBit) read configured to receive a parameter that selects one or more read voltage levels for which the CFBit read generates calibration-related information.

12. The system of claim 1, wherein the read voltage level calibration process comprises a coarse threshold estimate (CTE) process.

13. The system of claim 1, wherein the current calibration-related information comprises failed bit count information.

14. The system of claim 1, wherein the subsequent calibration-related information comprises failed bit count information.

15. At least one non-transitory machine-readable storage medium comprising instructions that, when executed by a processing device, cause the processing device to perform operations comprising:
   performing a non-skip iteration of a read voltage level calibration process on a select page of a select block of a memory device, the non-skip iteration comprising:
      performing, on at least a portion of the select page, a non-skip coarse threshold estimate read to generate current calibration-related information for a plurality of read voltage levels associated with the select page, the plurality of read voltage levels representing all read voltage levels associated with the select page;
      based on the current calibration-related information, determining whether at least one read voltage level in the plurality of read voltage levels need calibration; and
      in response to determining that a set of read voltage levels from the plurality of read voltage levels needs calibration and that the set of read voltage levels is less than all of the plurality of read voltage levels, performing a skip iteration of the read voltage level calibration process that comprises:
         attempting to calibrate the set of read voltage levels by adjusting a set of read voltage level offsets that corresponds to the set of read voltage levels; and
         performing, on at least the portion of the select page, a read-level-skip coarse threshold estimate read to generate subsequent calibration-related information for the set of read voltage levels while skipping generation of calibration-related information for any other read voltage level.

16. The at least one non-transitory machine-readable storage medium of claim 15, wherein the non-skip iteration comprises:
   in response to determining that all read voltage levels in the plurality of read voltage levels need calibration:
      attempting to calibrate the plurality of read voltage levels by adjusting a plurality of read voltage level offsets that corresponds to the plurality of read voltage levels; and
      reperforming the non-skip iteration of the calibration process.

17. The at least one non-transitory machine-readable storage medium of claim 15, wherein the set of read voltage levels is a first set of read voltage levels, wherein the subsequent calibration-related information is first calibration-related information, wherein the set of read voltage level offsets is a first set of read voltage level offsets for the first set of read voltage levels, and wherein the skip iteration is a first skip iteration, and wherein the first skip iteration comprises:
   based on the subsequent calibration-related information, determining whether at least one read voltage level in the first set of read voltage levels need calibration; and
   in response to determining that a second set of read voltage levels from the first set of read voltage levels needs calibration:
      attempting to calibrate the second set of read voltage levels by adjusting a second set of read voltage level offsets that corresponds to the second set of read voltage levels; and
      performing a second skip iteration of the read voltage level calibration process that performs the read-level-skip coarse threshold estimate read to generate second calibration-related information for the second set of read voltage levels while skipping generation of failed bit count information for any other read voltage level.

18. The at least one non-transitory machine-readable storage medium of claim 17, wherein the first skip iteration comprises:
   in response to determining that no read voltage level in the first set of read voltage levels needs calibration, ending the read voltage level calibration process.

19. The at least one non-transitory machine-readable storage medium of claim 15, wherein the read-level-skip coarse threshold estimate read comprises a coarse threshold estimate read configured to receive a parameter, the parameter selecting one or more read voltage levels for which the coarse threshold estimate read generates calibration-related information.

20. A method comprising:
   performing, by a processing device, a non-skip iteration of a read voltage level calibration process on a select page of a select block of a memory device, the non-skip iteration comprising:
      performing, on at least a portion of the select page, a non-skip coarse threshold estimate read to generate current calibration-related information for a plurality of read voltage levels associated with the select page, the plurality of read voltage levels representing all read voltage levels associated with the select page;

based on the current calibration-related information, determining whether at least one read voltage level in the plurality of read voltage levels need calibration; and in response to determining that a set of read voltage levels from the plurality of read voltage levels needs calibration and that the set of read voltage levels is less than all of the plurality of read voltage levels, performing a skip iteration of the read voltage level calibration process that comprises:
- attempting to calibrate the set of read voltage levels by adjusting a set of read voltage level offsets that corresponds to the set of read voltage levels; and
- performing, on at least the portion of the select page, a read-level-skip coarse threshold estimate read to generate subsequent calibration-related information for the set of read voltage levels while skipping generation of calibration-related information for any other read voltage level.

* * * * *